UNITED STATES PATENT OFFICE.

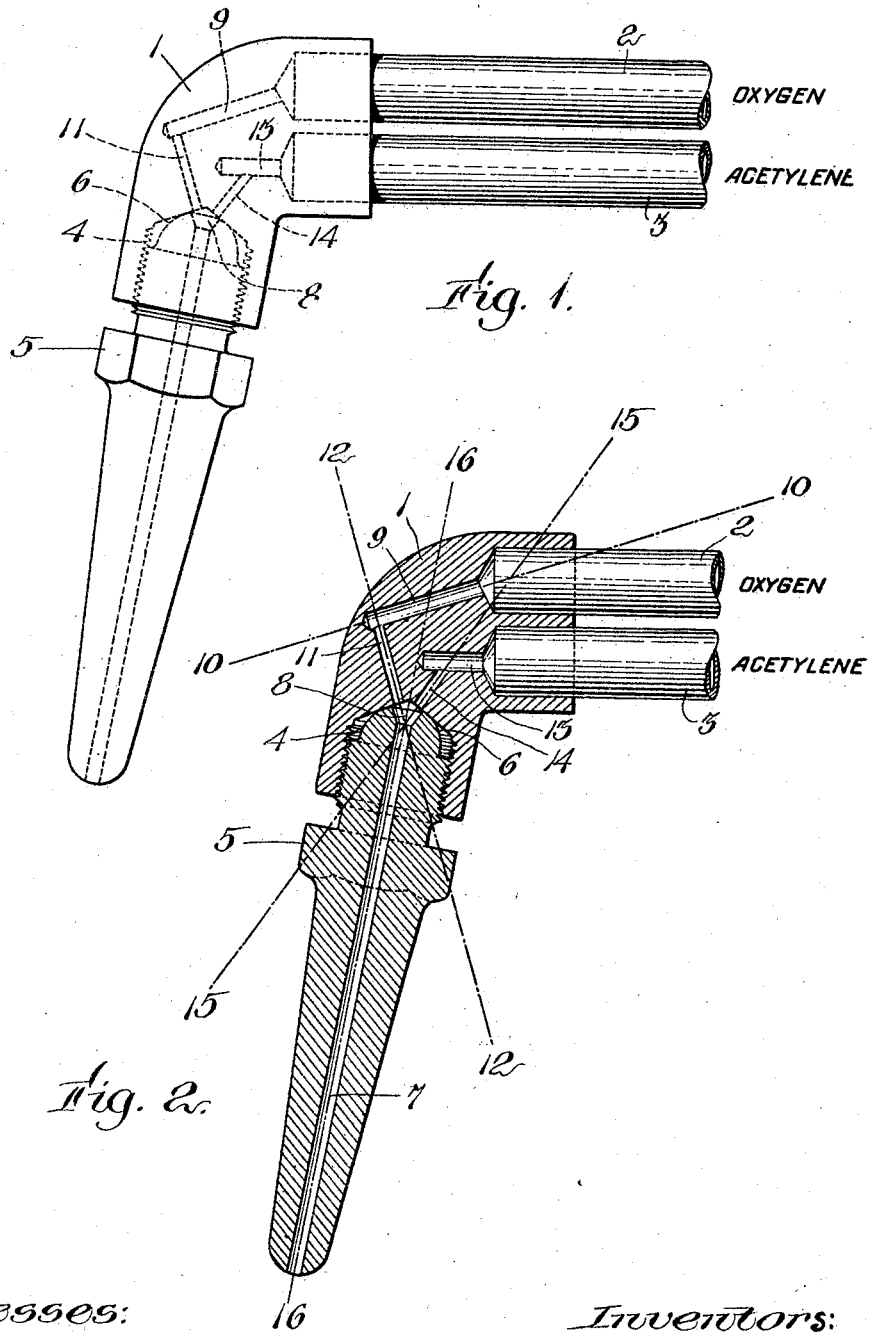

GEORGE H. DYER, OF SOMERVILLE, AND JOHN W. WHITFORD, OF BOSTON, MASSACHUSETTS; SAID WHITFORD ASSIGNOR TO SAID DYER.

ACETYLENE-TORCH.

1,099,973.  Specification of Letters Patent.  Patented June 16, 1914.

Application filed April 5, 1913. Serial No. 759,051.

*To all whom it may concern:*

Be it known that we, GEORGE H. DYER and JOHN W. WHITFORD, citizens of the United States, residing at Somerville and Boston, respectively, in the county of Middlesex and county of Suffolk, respectively, and State of Massachusetts, have invented certain new and useful Improvements in Acetylene-Torches; and we do hereby declare the following to be a full, clear, and exact description of the invention, such as will enable others skilled in the art to which it appertains to make and use the same.

The present invention relates to an improvement in acetylene torches.

The object of the invention is to reorganize and improve the construction and mode of operation of such torches, and to the above ends the invention consists in the torch hereinafter described and particularly defined in the claims.

In the accompanying drawings illustrating the preferred form of the invention, Figure 1 is a side elevation of the head of the torch, and Fig. 2 is a sectional elevation of the same.

The illustrated embodiment of the invention is described as follows:—The head 1 consists of a brass casting which receives the oxygen supply pipe 2 and the acetylene gas supply pipe 3 which are received in bores in the head, being secured therein by the use of a solder of high melting point, such as "silver" solder, so-called. The head is bored and threaded at 4 to receive the tip 5 which is screwed into it. The gas-tight joint between the tip and head is formed by the convex surface of the sealing projection 6 of the tip. The convex outer surface of the projection 6 engages the conical seat at the bottom of the tip recess 4. The tip is provided with a longitudinal bore 7 which is larger or smaller as the flame desired to be produced is larger or smaller. The upper end of the tip is countersunk at 8 to form a mixing chamber for the oxygen and the acetylene to mix in. This mixing chamber 8 is centrally positioned in the end of the sealing projection 6 of the tip. It is small in size. Its mouth is a trifle larger in diameter than is sufficient to include the two oxygen and acetylene conduits which discharge into it. The conduits in the head, conducting the gases to the tip, are made by drilling holes in the solid metal of the head. The oxygen conduit consists of a large portion 9 which is bored through the oxygen pipe opening before the pipe is inserted. It will be observed that the center line 10—10 of this portion 9 of the oxygen conduit passes through the mouth of the opening for the oxygen pipe 2. The reduced portion 11 of the oxygen conduit is bored from the tip recess 4. The center line 12—12 of this reduced portion clearly shows that this hole may be bored from the tip recess before the latter is inserted. The large portion 13 of the acetylene conduit is co-axial with the acetylene pipe hole in the head and may be bored at the same time or after the boring of the acetylene pipe hole. The reduced portion 14 of the acetylene conduit is bored from the tip recess in the same manner as the reduced portion 11 of the oxygen conduit is bored therefrom. The center line of the reduced portion 14 of the acetylene conduit is indicated by the line 15—15. The center line 16—16 of the tip is also shown on the drawings. It will be observed that the center lines 12—12 and 15—15 both intersect the center line of the tip in the center of the mixing chamber 8, and that they both make the same angle to the tip. The pressures of the oxygen and the acetylene are properly proportioned in order to secure the correct mixture of the gases.

One of the important features of the present invention resides in making the mixing chamber of small volume. This reduces back-firing. An endeavor has been made to ascertain the reason for this, but without success, so, while the inventors have ascertained the fact, they are unable to state the exact scientific reason for it. It is a feature of advantage that the mixing chamber is in the tip instead of in the head, because, in case of back-fires, the injury is to the tip instead of to the head—that is, the injury is to a part more readily renewed. Besides, the fact that the mixing chamber is nearer the tip is of advantage in that the heat generated therein, in case of back-fire, is dissipated more readily the nearer it is to the tip, because the distance therefrom is the less. That is to say, the heat is conducted away from it with greater facility than where it is embedded in the body of the head casting. Another useful feature of the present construction resides in the fact that by removing the tip, the small-diameter conduit holes 11 and 14 may be cleaned with ease by direct access thereto through the tip opening 4. Another feature of the invention resides in the arrangement of the gas conduits 11 and 14 at their discharge ends, that is, at the point where they discharge into the mixing chamber, so that neither acts as an injector for the other.

Having thus described the invention, what is claimed is:—

1. An acetylene torch having, in combination, a head, oxygen and acetylene pipes connected therewith, a tip recess therein having a conical seat at the bottom, oxygen and acetylene conduits leading from the pipes to the tip recess, a tip secured in the tip recess and having a small mixing chamber in its end registering with the central portion or apex of the conical seat and into which the oxygen and acetylene conduits discharge.

2. An acetylene torch, having, in combination, a head, oxygen and acetylene pipes connected therewith, a tip recess therein having a conical seat at its bottom, oxygen and acetylene conduits leading from the pipes to the tip recess, a tip secured in the recess having a convex surfaced sealing projection fitting against said conical seat and having a small mixing chamber in the center of said sealing projection registering with the central portion or apex of the conical seat and into which the oxygen and acetylene conduits discharge.

GEORGE H. DYER.
JOHN W. WHITFORD.

Witnesses:
HORACE VAN EVEREN,
GEO. E. STEBBINS.